United States Patent
Subbarao et al.

(10) Patent No.: US 11,249,896 B2
(45) Date of Patent: Feb. 15, 2022

(54) LOGICAL-TO-PHYSICAL MAPPING OF DATA GROUPS WITH DATA LOCALITY

(71) Applicant: Micron Technology, Inc., Boise, ID (US)

(72) Inventors: Sanjay Subbarao, Irvine, CA (US); Johnny A. Lam, Firestone, CO (US); John E. Maroney, Irvine, CA (US); Mark Ish, San Ramon, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 211 days.

(21) Appl. No.: 16/722,717

(22) Filed: Dec. 20, 2019

(65) Prior Publication Data

US 2021/0191850 A1   Jun. 24, 2021

(51) Int. Cl.
*G06F 12/02* (2006.01)
*G06F 12/0873* (2016.01)
*G06F 9/355* (2018.01)
*G06F 12/0882* (2016.01)

(52) U.S. Cl.
CPC .......... *G06F 12/0246* (2013.01); *G06F 9/355* (2013.01); *G06F 12/0873* (2013.01); *G06F 12/0882* (2013.01); *G06F 2212/7201* (2013.01)

(58) Field of Classification Search
CPC ... G06F 3/06–0689; G06F 9/355–3557; G06F 12/0246; G06F 12/0873; G06F 12/0882; G06F 2212/7201
See application file for complete search history.

(56) References Cited

U.S. PATENT DOCUMENTS

| | | | |
|---|---|---|---|
| 9,396,103 B2 | 7/2016 | Sinclair et al. | |
| 10,031,845 B2 | 7/2018 | Hady | |
| 10,409,714 B1* | 9/2019 | Shah | G06F 12/0238 |
| 2016/0378364 A1* | 12/2016 | Malina | G06F 3/0667 |
| | | | 711/114 |
| 2017/0024127 A1* | 1/2017 | Bazarsky | G06F 3/0679 |
| 2017/0300422 A1* | 10/2017 | Szubbocsev | G06F 12/10 |
| 2018/0232181 A1* | 8/2018 | Zhou | G06F 3/0688 |
| 2018/0349266 A1 | 12/2018 | Canepa et al. | |

(Continued)

OTHER PUBLICATIONS

PCT Notification of Transmittal of the International Search Report and the Written Opinion of the International Searching Authority for PCT Application No. PCT/US2020/065870, dated Apr. 19, 2021, 11 pages.

*Primary Examiner* — Nicholas J Simonetti
(74) *Attorney, Agent, or Firm* — Lowenstein Sandler LLP

(57) ABSTRACT

A system includes integrated circuit (IC) dies having memory cells and a processing device coupled to the IC dies. The processing device performs operations including storing, within a zone map data structure, zones of a logical block address (LBA) space sequentially mapped to physical address space of the IC dies. A zone map entry in the zone map data structure corresponds to a data group written to one or more of the IC dies. The operations further include storing, within a block set data structure indexed by a block set identifier of the zone map entry, a die identifier and a block identifier for each data block of multiple data blocks of the data group, and writing multiple data groups, which are sequentially mapped across the zones, sequentially across the IC dies. Each data block can correspond to a media (or erase) block of the IC dies.

20 Claims, 10 Drawing Sheets

(56) References Cited

U.S. PATENT DOCUMENTS

2019/0212940 A1* 7/2019 Cai .................. G06F 11/076
2019/0303293 A1  10/2019 Byun
2020/0409589 A1* 12/2020 Bennett ............. G06F 3/0679

* cited by examiner

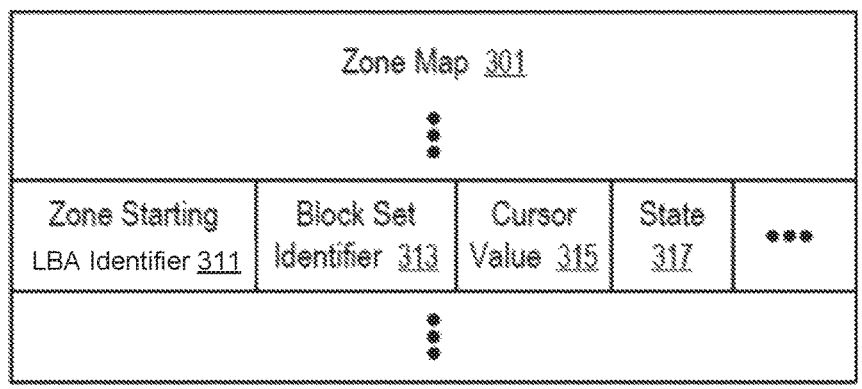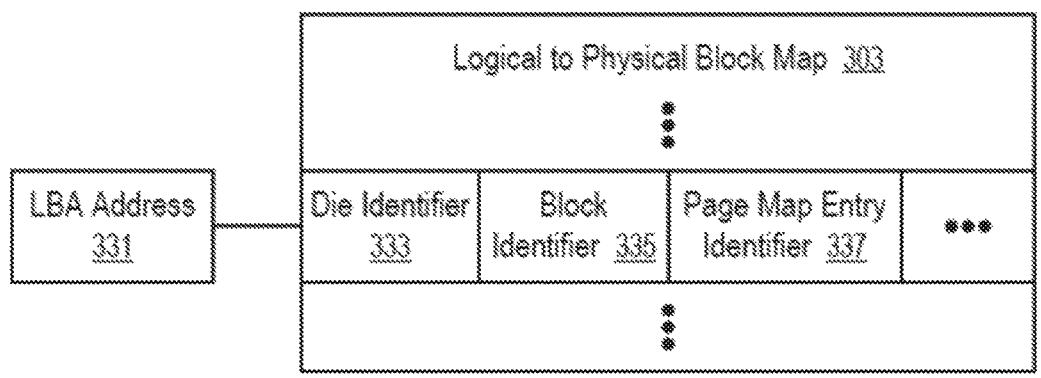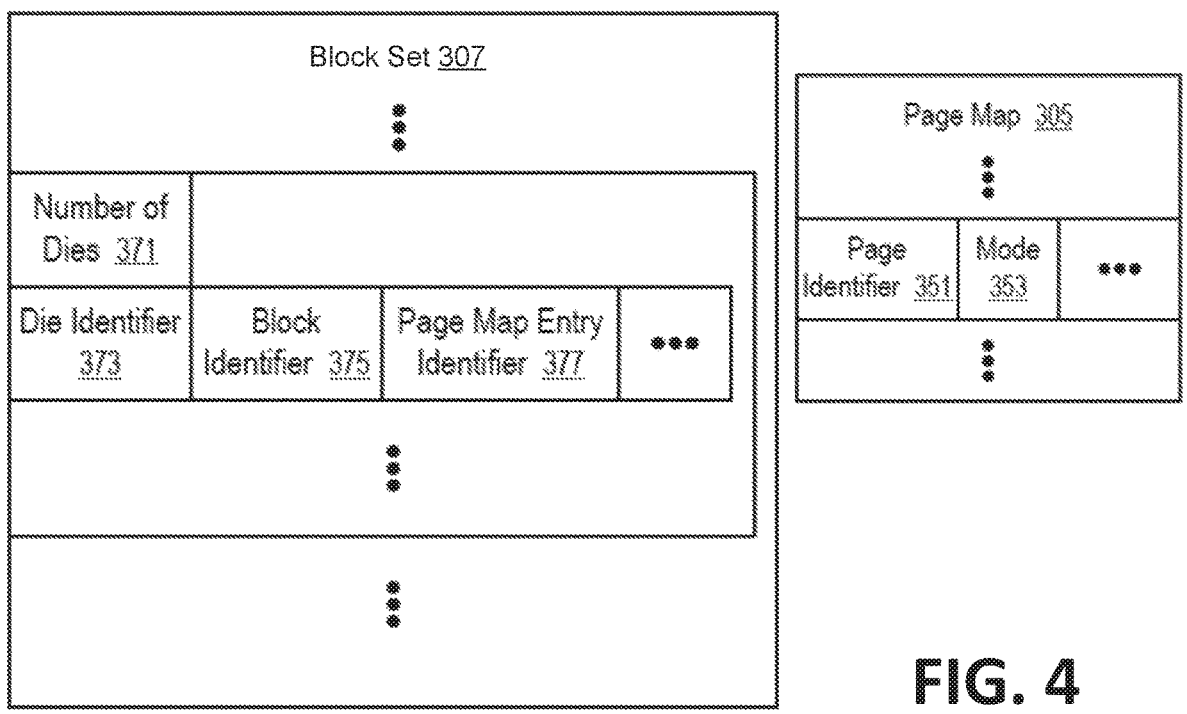
FIG. 4

700

---

Store, within a zone map data structure, zone map entries for zones of a logical block address (LBA) space sequentially mapped to physical address space of multiple IC dies, wherein a zone map entry in the zone map data structure corresponds to a data group written to one or more IC dies of the multiple IC dies.
710

---

Store, within a block set data structure indexed by a block set identifier of the zone map entry, a die identifier and a block identifier for each of multiple data blocks of the data group.
720

---

Write multiple data groups, which are sequentially mapped across the zones, sequentially across the multiple IC dies.
730

```
Extract, from a write command, the zone start LBA identifier at which to
begin writing the data received from a host system and a sector count value
to indicate a number of bytes of the data group. 810
                              ↓
Determine a zone identifier based on the zone start LBA identifier and a zone
size value. 815
                              ↓
Determine a zone offset value based on the zone cursor value and a
multiplane page size. 820
                              ↓
Look up the zone map entry within the zone map data structure using the
zone identifier. 825
                              ↓
Extract the block set identifier from the zone map entry. 830
                              ↓
Determine the die identifier and the block identifier for each of the multiple
data blocks via access to the block set entry, to which points the block set
identifier. 835
                              ↓
Determine the page map offset value for each of the multiple data blocks
based on the zone offset value and the block size value. 840
                              ↓
Determine a page identifier using the page map offset value to access the
page map entry, the page identifier to identify a page within each respective
IC die and block, corresponding to the die identifier and block identifier,
respectively, at which to begin writing respective ones of the multiple data
blocks. 845
                              ↓
Increment the zone cursor value by the number of bytes associated with the
sector count. 850
                              ↓
Increment each page map offset value depending on the number of bytes
written to respective ones of the one or more IC dies. 855
```

FIG. 8

LOGICAL-TO-PHYSICAL MAPPING OF DATA GROUPS WITH DATA LOCALITY

TECHNICAL FIELD

Embodiments of the disclosure relate generally to memory sub-systems, and more specifically, related to logical-to-physical mapping of data groups of a memory sub-system that have data locality.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 4 is a media block diagram that illustrates an example of data structures configured to support dynamic data placement according to various embodiments.

FIG. 7 is a flow chart of a method for sequentially mapping data that is sequentially written to the IC dies of the memory sub-system according to an embodiment.

FIG. 8 is a flow chart of a method for fulfilling a write command using mapping data structures generated by the method of FIG. 7 according to various embodiments.

DETAILED DESCRIPTION

Figure 1:
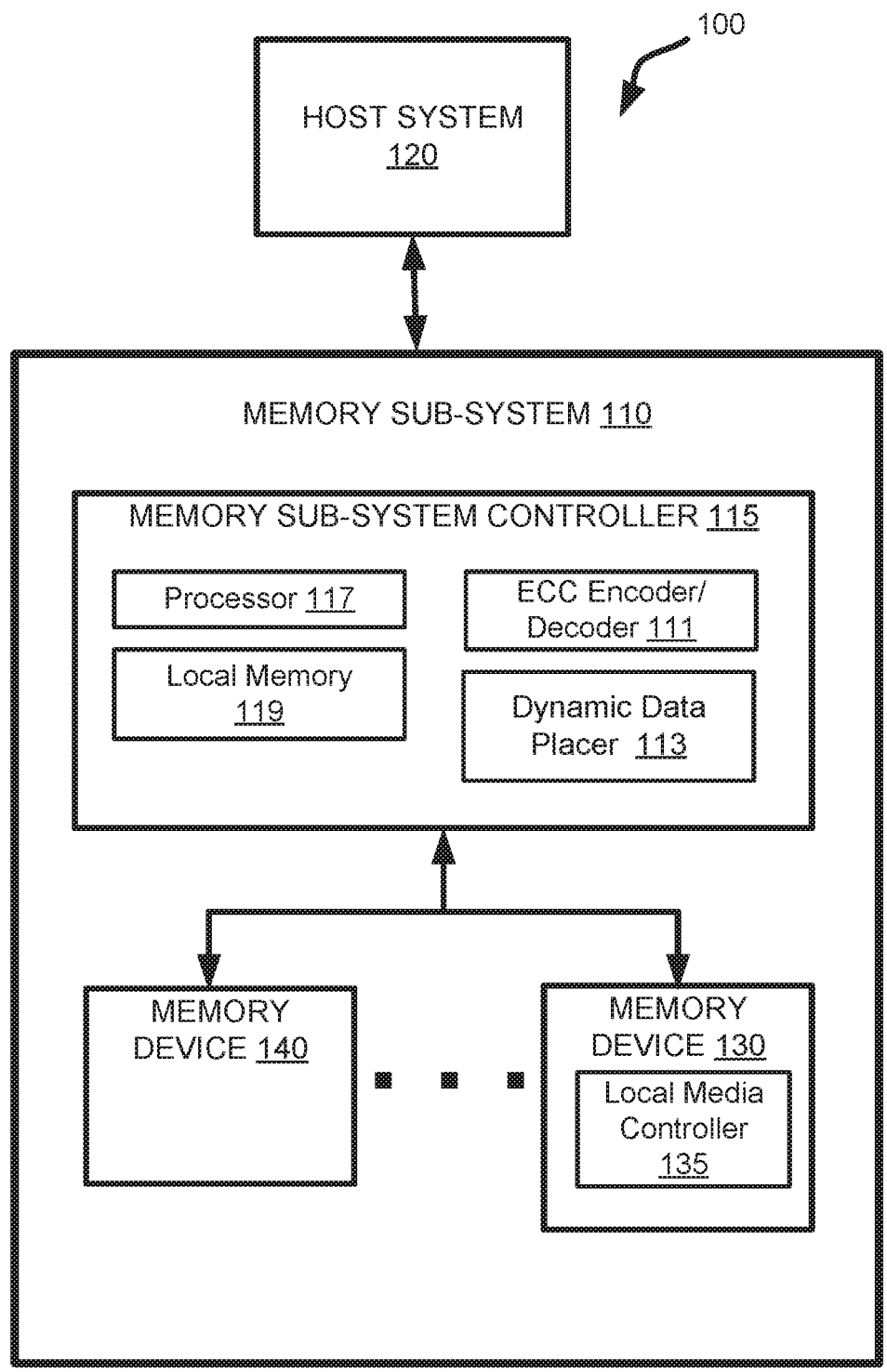
FIG. 1 illustrates an example computing system that includes a memory sub-system according to embodiments of the present disclosure.

Aspects of the present disclosure are directed to logical-to-physical mapping of data groups of a memory sub-system that have data locality. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory sub-system can include multiple components, such as memory devices that can store data from the host system in storage media, e.g., integrated circuit (IC) dies, which will be generally referred to as media herein. This media can be understood as the writeable memory portion of a memory device. Conventional processing in memory sub-systems today is generally performed with random allocations to the media and in small increments of data, e.g., four kilobytes (KB) or the like. These random allocations include non-sequential and/or random writes to the IC dies. This practice results in high costs in memory, e.g., dynamic random access memory (DRAM), for storing mapping data structures that track logical-to-physical address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of DRAM mapping overhead. Additionally, periodic snapshotting and logging is done to persist the mapping data structures across shutdowns and surprise power failure situations. This adds additional write overhead to media and performance loss.

Due to recent innovations in host software, stacks included in file systems group data by locality and write the data sequentially to storage devices. File systems can then write data of different localities as parallel sequential streams to storage devices, each stream having its own locality. Reference to locality may be reference to either temporal locality or spatial locality. Data having temporal locality is data that a processor tends to access at the same memory locations repetitively over a short period of time, e.g., data written, over-written, and trimmed around the same time. Data having spatial locality captures the tendency of when a particular storage location is referenced at a particular time, then it is likely that nearby memory locations will be referenced in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array. The term locality of data can therefore refer to either or both of temporal locality or spatial locality as used herein.

At least some aspects of the present disclosure address the above and other deficiencies through dynamic data placement and mapping. In particular, the present disclosure discusses the data corresponding to a data locality group (e.g., "data group") being sequentially written into a media block set, also referred to as an erase unit due to likely being erased at the same time as well. The mapping within the LBA space may be referred to as zones. Thus, mapping can be recorded at a higher granularity (megabytes instead of kilobytes) in order to map a particular data group as a zone in the LBA space. In one example, a data group is made up of multiple data blocks of data having locality, where each data block corresponds to a media block (e.g., erase unit) of the IC dies. In one embodiment, the media block (or erase unit) of a memory device is around 100 megabytes (MB) in size. The data group can be at least two to four times (or more) the size of the media block. Accordingly, the data group can include at least 400 megabytes of data (e.g., 400 MB, 500 MB, 600 MB, or more), each of which is significantly larger than four kilobytes (KB).

In various embodiments, because the data groups are sequentially written into the IC dies of storage media, the mapping is at a higher granularity and is simplified. For example, the memory sub-system, via the mapping data structures, can track a location within the zones of the LBA space that is next to be written (e.g., via a zone cursor or LBA offset) and can track locations within one or more IC dies that are next to be written (e.g., via a next page map offset value for each IC die). Being sequentially written to the IC dies can be performed either serially, e.g., filling up one IC die before moving to fill up the next IC die, or in parallel, e.g., sequentially filling up a multiple IC dies in parallel. On a host read, an LBA of a read request can be treated as an offset within a zone that can be translated (mapped) into a corresponding block set to compute a physical page address for reading the page to which the LBA refers, as will be discussed in more detail.

Advantages of the present disclosure include but are not limited to significant mapping overhead reduction from a GB per TB of memory to about 100 KB per TB, resulting in significant cost savings in memory usage for logical-to-physical address mapping. This reduction in mapping overhead is due to the mapping granularity being increased from 4 KB to hundreds of megabytes, e.g., the size of the data group. Further, write overhead and performance losses for performing periodic snapshotting and logging of the mapping data structures are also significantly reduced. Additionally, a smaller page map skip list can be maintained per data locality for mapping out bad data planes (within a multiplane block) and bad wordlines. Cost of this table is small, e.g., less than a kilobyte per data group. Other advantages will be apparent to those skilled in the art of memory allocation and mapping within a memory sub-system discussed hereinafter.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative- and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAIVI), magneto random access memory (MRAM), Spin Transfer Torque (STT)-MRAM, conductive bridging RAM (CBRAM), resistive random access memory (RRAM), oxide based RRAM (OxRAIVI), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

The computing system 100 includes a dynamic data placer 113 in the memory sub-system 110 that dynamically determines a media layout to place data associated with logical addresses in the media units or memory components (also referred to as "IC dies" or "media") of the memory devices 130 or 140. A media layout specifies the mapping between the addresses used in commands received in the memory sub-system 110 from the host system 120 and the physical memory locations in the media of the memory sub-system 110. In some embodiments, the controller 115 includes at least a portion of the dynamic data placer 113. In other embodiments, or in combination, a controller and/or a processing device of the host system 120 includes at least a portion of the dynamic data placer 113. For example, the controller 115, or the processing device (processor) of the host system 120, can be configured to execute instructions stored in memory for performing the operations of the dynamic data placer 113 described herein. In some embodiments, the dynamic data placer 113 is implemented in an integrated circuit chip disposed in the memory sub-system 110. In other embodiments, the dynamic data placer 113 is part of an operating system of the host system 120, a device driver, or an application.

The dynamic data placer 113 can determine the media layout for a portion of logical addresses of LBA space for the placement of data at the logical addresses associated with physical addresses of media of the memory device 130 or 140, e.g., based on the availability of the media to write, program, store, commit data at the time of input/output scheduling in the memory sub-system 110. When IC die(s), including media units within the IC die(s), are available for committing/programming data, a write command is scheduled for execution in the memory sub-system 110; and the dynamic data placer 113 generates a portion of the media layout for the write command and maps the logical address(es) used in the write command to map to memory locations within the IC die(s). The execution of the write command causes the memory sub-system 110 to commit/program data associated with the write command into the IC die(s).

Depending on availability of IC dies across the media and/or application of a sequential mapping scheme, the controller can either sequentially write data groups of the data (e.g., provided in a sequential stream of data locality) to fill up one IC die at a time or can sequentially write to multiple IC dies at a time, in parallel, e.g., to concurrently fill up the IC dies of the media. The mapping of the writes within the zones of the LBA space can also be done sequentially to simplify the calculations used to perform the mapping, as will be discussed in more detail. When there are multiple IC dies available, logical addresses (e.g., LBA) used in the commands from multiple write streams can be mapped by the dynamically generated portion of the media layout to the multiple IC dies respectively, such that there is no media access collision in the execution of the commands from the multiple write streams. Further details with regards to the operations of the dynamic data placer 113 are described below.

Figure 2:
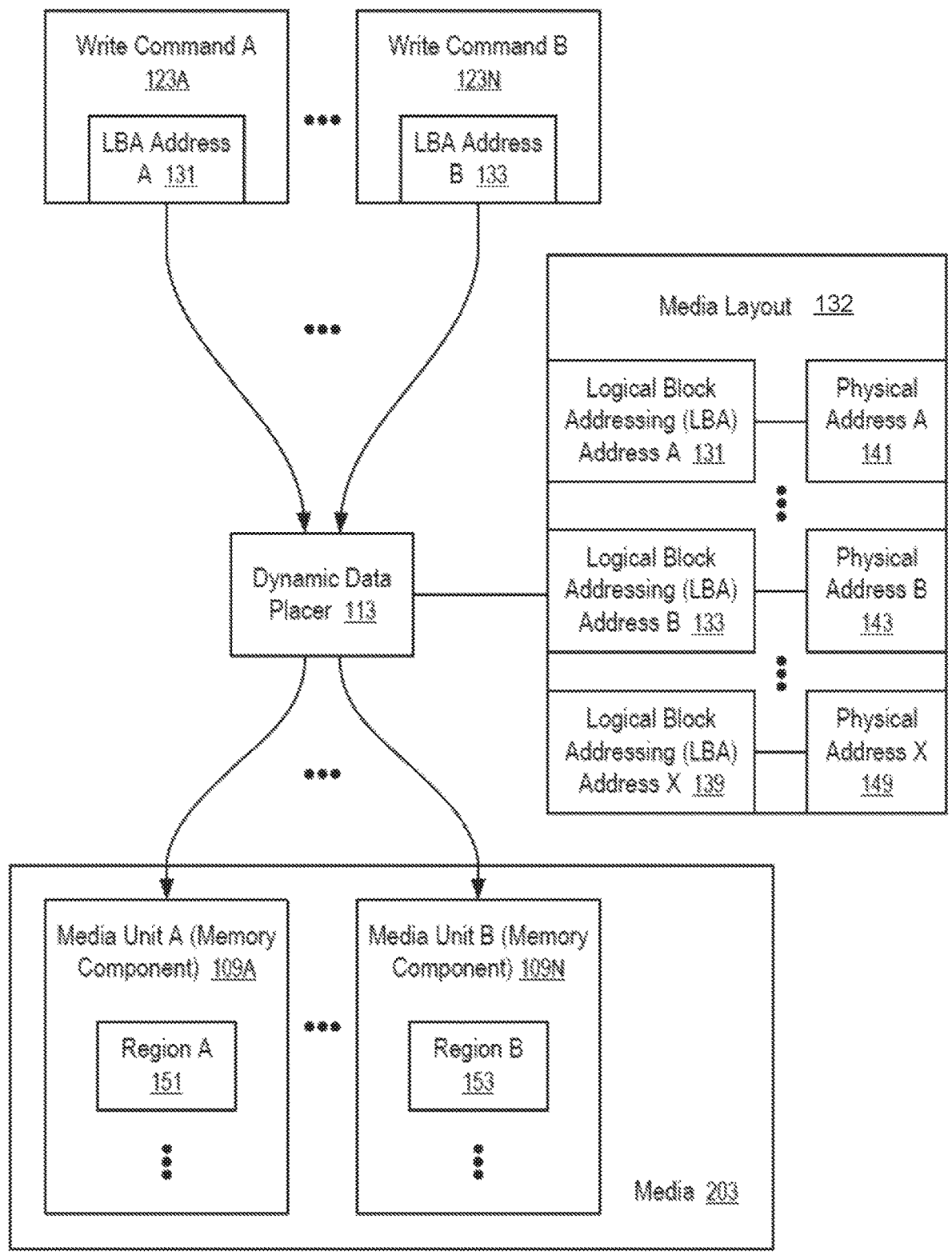
FIG. 2 is a block diagram that illustrates a dynamic data placer configured to determine and map a media layout in a way that reduces and/or avoids collisions in concurrent media accesses in writing data according to various embodiments.

FIG. 2 is a block diagram that illustrates a dynamic data placer 113 configured to determine a media layout 132 in a way that reduces and/or avoids collisions in concurrent media accesses in writing data. For example, the dynamic data placer 113 and the media layout 132 can be implemented in the computing system 100 of FIG. 1.

With reference to FIG. 2, multiple write commands 123A to 123N are scheduled for execution in parallel. The number of write commands 123A to 123N scheduled for parallel execution is based on the number of media units/memory components 109A to 109N that are available for parallel operations within media 203. The media 203 can be located within or be a combination of the memory devices 130 and 140 of FIG. 1. The write commands 123A to 123N can be from multiple write streams respectively.

The write commands 123A to 123N specify locations for the write operations using logical block addresses (LBAs) 131, ..., 133. At the time of scheduling the write commands 123A to 123N, the dynamic data placer 113 generates the mapping of the LBAs 131, ..., 133 to physical addresses 141, ..., 143. Since the media units/memory components 109A to 109N are determined to be available for parallel write operations, the dynamic data placer 113 maps each of the LBAs 131, ..., 133 into different regions 151, ..., 153 of the media units/memory components 109A to 109N. Thus, the physical addresses 141, ..., 143 for the LBAs 131, ..., 133 correspond to memory regions 151, ..., 153 in different media units/memory components 109A, ..., 109N. Since no two of the physical addresses 141, ..., 143 are for memory regions in a same media unit (e.g., 109A or 109N), there can be no collision in the parallel execution of the write commands 123A, ..., 123N. Thus, media access collisions are eliminated.

In general, the write operations across the different media units/memory components 109A to 109N may not be in unison. Thus, when a subset of the media units/memory components 109A, ..., 109N becomes available for next write operations, another subset of the media units/memory components 109A, ..., 109N can be still busy in their operations and not available for next write operations. Some of the media units/memory components 109A, ..., 109N can be busy in performing other operations, such as read operations, erasure operations, and thus not available for performing write operations. In general, when one or more write commands are scheduled for the available subset of the media units/memory components 109A, ..., 109N, the dynamic data placer 113 generates the portion of the media layout 132 to map the LBA of the scheduled write commands to the physical addresses of memory regions in the available subset of the media units/memory components 109A, ..., 109N. Thus, the scheduled commands can be executed without media access collisions.

Figure 3:
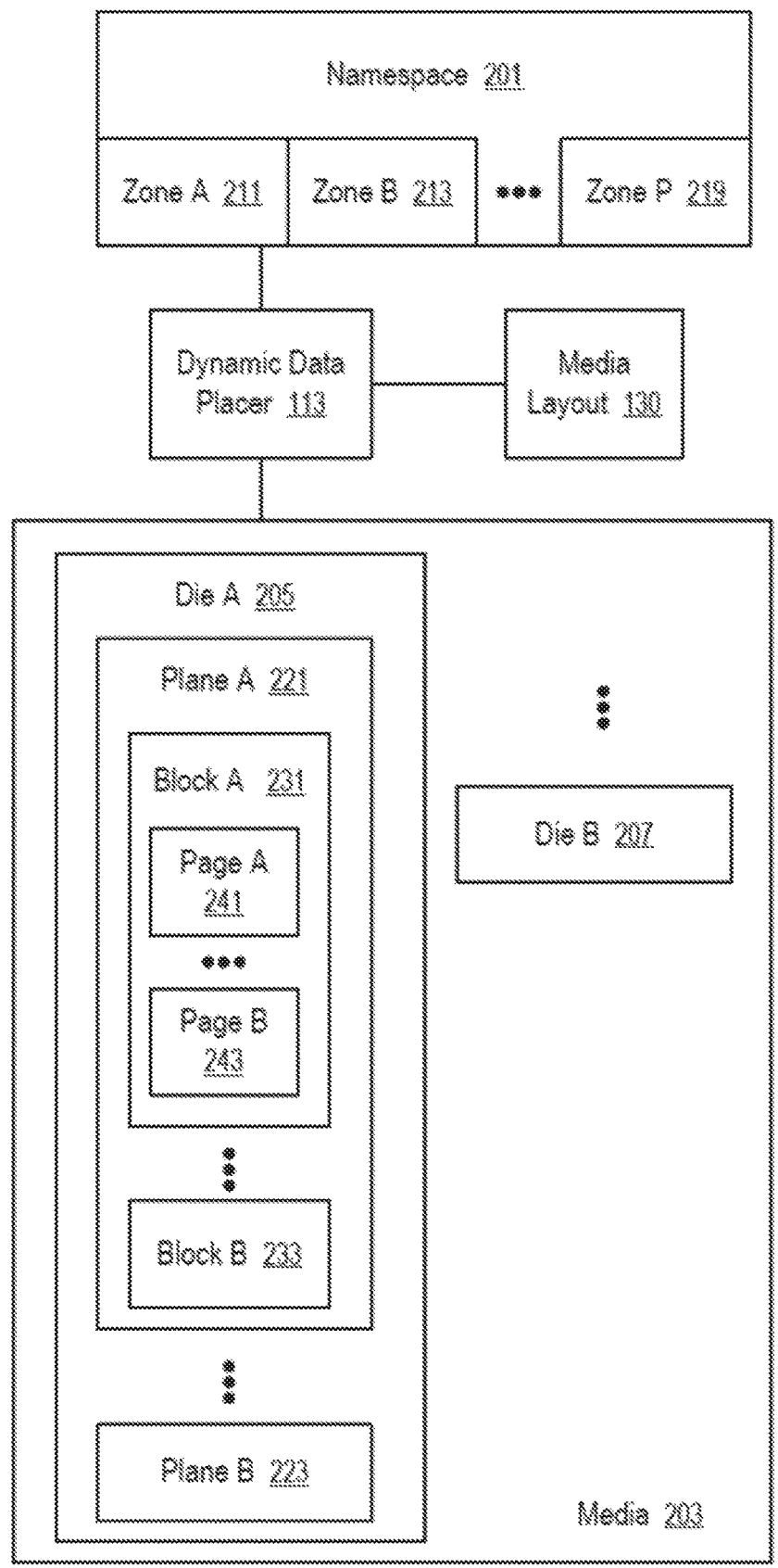
FIG. 3 is a block diagram that illustrates an example of a memory sub-system having dynamic data placement according to some embodiments.

FIG. 3 is a block diagram that illustrates an example of a memory sub-system having dynamic data placement. For example, the memory sub-system of FIG. 3 can be implemented in the memory sub-system 110 of FIG. 1 using a dynamic data placer 113 of FIG. 2. However, the techniques of FIG. 1 and FIG. 2 are not limited to the implementation of the memory sub-system illustrated in FIG. 3. For example, the techniques can be implemented a plain block device, a device that supports namespaces, or a device that supports zoned names spaces (e.g., a memory sub-system illustrated in FIG. 3). Thus, the disclosure presented herein is not limited to the example of FIG. 3.

In FIG. 3, a namespace 201 is configured on the media storage capacity of the memory sub-system 110. The namespace 201 provides a logical block addressing (LBA) space that can be used by the host system 120 to specify memory locations for read or write operations. The namespace 201 can be allocated on a portion of the media storage capacity of the memory sub-system 110, or the entire media storage capacity of the memory sub-system 110. In some instances, multiple namespaces can be allocated on separate, non-overlapping portions of the media storage capacity of the memory sub-system 110.

In FIG. 3, the namespace 201 is configured with a plurality of zones 211, 213, ..., 219. Each zone (e.g., 211) in the namespace allows random read access to LBA addresses in the zone (e.g., 211) and sequential write access to LBAs in the zone (e.g., 211), but does not allow random write access to random LBA addresses in the zone (211). Thus, writing data into a zone (e.g., 211) is performed in a predetermined, sequential order in the LBA address space of the namespace 201.

When a zone (e.g., 211) in the namespace 201 is configured, it is possible to predetermine the media layout for the zone (e.g., 211) (e.g., for simplicity). The LBAs in the zone (e.g., 211) can be pre-mapped to the media 203 of the memory sub-system 110. However, such a predetermined media layout can cause media access collisions when there are multiple parallel write streams, as discussed above.

Randomizing the mapping from LBAs in the zone (e.g., 211) to memory locations in the media 203 can reduce collisions but cannot eliminate collisions.

Preferably, the dynamic data placer 113 is configured in the memory sub-system 110 to create portions of the media layout 132 at the time of the scheduling of write commands for execution such that collisions are completely eliminated. For example, the media 203 of the memory sub-system 110 can have multiple integrated circuit dies 205, . . . , 207. Each of the integrated circuit dies (e.g., 205) can have multiple planes 221, . . . , 223 of memory units (e.g., NAND memory cells). Each of the planes (e.g., 221) can have multiple blocks 231, . . . , 233 of memory units (e.g., NAND memory cells). Each of the blocks (e.g., 231) can have multiple pages 241, . . . , 243 of memory units (e.g., NAND memory cells). The memory units in each page (e.g., 241) is configured to be programmed to store/write/commit data together in an atomic operation; and the memory units in each block (e.g., 231) is configured to be erased data together in an atomic operation.

When a write command (e.g., 123A) for storing data in one zone (e.g., 211) and another write command (e.g., 123N) for storing data in another zone (e.g., 213) are scheduled for parallel execution as a result of two integrated circuit dies (e.g., 205 and 207) are available for concurrent operations, the dynamic data placer 113 maps the LBAs (e.g., 131 and 133) of the write commands (e.g., 123A and 123N) into pages located in the different dies (e.g., 205 and 207). Thus, media access collisions can be avoided.

FIG. 4 illustrates an example of data structures configured to support dynamic data placement and mapping. The controller 115 can store the data structures illustrated in FIG. 4 in the local memory 119, e.g., in SRAM, or in memory components of the memory device 140, e.g., in DRAM. The controller 115 can also configure or implement the media layout 132 of FIG. 2 or FIG. 3 using the data structures of FIG. 4. In FIG. 4, a zone map data structure 301 is configured to provide media layout information for a zone (e.g., 211) in a namespace (e.g., 201). The zone map data structure 301 can have multiple entries. Each zone map entry in the zone map data structure 301 identifies information about a zone (e.g., 211), such as a starting LBA address 311 of the zone (e.g., 211), a block set identifier 313 of the zone (e.g., 211), a zone cursor value 315 of the zone (e.g., 211), a state 317 of the zone (e.g., 211), a the like.

The host system 120 writes data in the zone (e.g., 211) beginning at the LBA of the zone starting LBA identifier 311. The host system 120 writes data in the zone (e.g., 211) sequentially in the LBA space. After an amount of data has been written into the zone (e.g., 211), the current starting LBA address for writing subsequent data is identified by the zone cursor value 315. Each write command for the zone moves the zone cursor value 315 to a new starting LBA address for the next write command for the zone. The state 317 can have a value indicating that the zone (e.g., 211) is empty, full, implicitly open, explicitly open, closed, and the like, to track progress of writing that zone.

In FIG. 4, a logical-to-physical block map data structure 303 is configured to facilitate the translation of LBA addresses (e.g., 331) into physical addresses in the media (e.g., 203). The logical-to-physical block map 303 can have multiple entries. An LBA (e.g., 331) can be used as, or converted into, an index for an entry in the logical to physical block map 303. The index can be used to look up an entry for the LBA (e.g., 331). Each entry in the logical-to-physical block map 303 identifies, for an LBA (e.g., 331), the physical address of a block of memory in the media (e.g., 203). For example, the physical address of the block of memory in the media (e.g., 203) can include a die identifier 333, a block identifier 335, a page map entry identifier 337, and the like. A die identifier 333 identifies a specific IC die (e.g., 205 or 207) in the media 203 of the memory sub-system 110. A block identifier 335 identifies a specific block of memory (e.g., NAND flash memory) within the IC die (e.g., 205 or 207) that is identified using the die identifier 333. A page map entry identifier 337 identifies an entry in the page map data structure 305.

The page map data structure 305 can have multiple entries. Each entry in the page map 305 can include a page identifier 351 that identifies a page of memory cells within a block of memory cells (e.g., NAND memory cells). For example, the page identifier 351 can include a word line number for the page and a sub block number for the page in the block of NAND memory cells. Further, the entry for the page can include a programming mode 353 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die (e.g., 205 or 207) can have different modes for data programming.

In FIG. 4, the block set data structure 307 stores data controlling aspects of the dynamic media layout for a zone (e.g., 211). The block set data structure 307, which can be a table in one embodiment, can have multiple entries. Each block set entry in the block set data structure 307 identifies a number/count 371 of integrated circuit dies (e.g., 205 and 207) in which data of the zone (e.g., 211) is stored. For each of the integrated circuit dies (e.g., 205 and 207) used for the zone (e.g., 211), the block set entry of the block set data structure 307 has a die identifier 373, a block identifier 375, a page map entry identifier 377, a page map offset value 500 (see FIGS. 5A-5B), and the like.

The die identifier 373 identifies a specific IC die (e.g., 205 or 207) in the media 203 of the memory sub-system 110, on which IC die (e.g., 205 or 207) subsequent data of the zone (e.g., 211) can be stored. The block identifier 375 identifies a specific block (e.g., 231 or 233) of memory (e.g., NAND flash memory or other media) within the IC die (e.g., 205 or 207) that is identified using the die identifier 373, in which block (e.g., 231 or 233) the subsequent data of the zone (e.g., 211) can be stored. The page map entry identifier 337 identifies a page map entry in the page map data structure 305, which identifies a page (e.g., 241 or 241) that can be used to store the subsequent data of the zone (e.g., 211).

For example, a memory sub-system 110 receives multiple streams of write commands. In an embodiment, each respective stream in the multiple streams is configured to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of write streams is permitted to sequentially write at LBAs in a zone (e.g., 211) in a namespace (e.g., 201) allocated on a media 203 of the memory sub-system 110, but prohibited from writing data out of sequence in the LBA (or logical address) space. The dynamic data placer 113 of the memory sub-system 110 identifies multiple media units (e.g., 109A to 109N) in the memory sub-system 110 that are available to write data concurrently.

The dynamic data placer 113 can select first commands from the multiple streams for concurrent execution in the multiple media units that are available to write data. The dynamic data placer 113 can generate and store, dynamically in response to the first commands being selected for concurrent execution in the multiple media units, a portion of a media layout 132 that maps from logical addresses identified by the first commands in the logical address space to physical addresses of memory units in the multiple media units.

The memory sub-system 110 executes the first commands concurrently by storing data into the memory units according to the physical addresses. For example, at the time of scheduling the first commands for execution, execution second commands can be in progress in a subset of memory units of the media of the memory sub-system 110. Thus, the subset of memory units used for the execution of the second commands are not available for the first commands. After the first commands are scheduled and the portion of the media layout for the logical addresses used in the first commands is determined, the first commands can be executed in the multiple media units concurrently and/or concurrently with the progress of the execution of the second commands in remaining media units of the memory sub-system 110.

For example, after the identification of the multiple memory units (e.g., IC dies) that are available for the execution of next commands, the dynamic data placer 113 can identify, from the block set data structure 307, the physical addresses that can be used to store data of the next commands. The physical addresses can be used to update the corresponding entries in the logical to physical block map 303 for the LBA addresses used in the next commands.

For example, when an IC die (e.g., 205) is free to write data, the dynamic data placer 113 can determine a command of a zone that can be written/programmed into the memory cells in the IC die (e.g., 205). From the block set data structure 307, the dynamic data placer 113 locates an entry for the zone (e.g., 205), locates the block identifier 375 and the page map entry identifier 377 associated with the identifier 373 of the integrated circuit die (e.g., 205), and uses the die identifier 373, the block identifier 375, and the page map entry identifier 377 to update the corresponding fields of the entry in the logical to physical block map 303 for the LBA 331 used in the command of the zone (e.g., 211). Thus, the command of the zone (e.g., 211) can be executed without media access collision for the LBA 331.

Figure 5A:
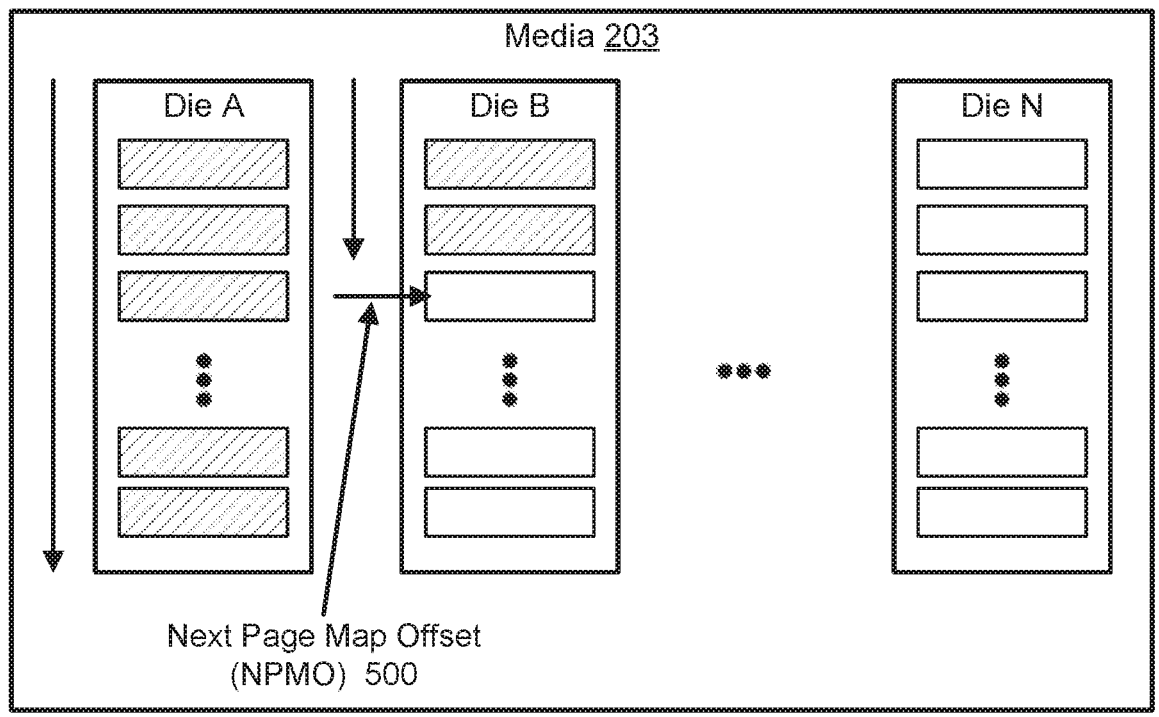
FIG. 5A is a media block diagram that illustrates functionality of the dynamic data placer in writing sequentially in series to a number of integrated circuit (IC) dies of the memory sub-system according to an embodiment.

FIG. 5A is a media block diagram of the media 203 that illustrates functionality of the dynamic data placer 113 in writing sequentially in series to a number of IC dies of the memory sub-system 110 according to an embodiment. Note the downward facing arrows illustrates progress of writing, and the shaded squares are pages that have already been written. A next page map offset (NPMO) 500 can be a pointer that indexes to a next open (e.g., unwritten) page in a sequential writing process. In the illustrated example, the sequential writing includes writing the multiple data blocks of each data group of the multiple data groups until sequentially filling up a first IC die (Die A) followed by sequentially filling up a second IC die (Die B), and so forth through a last IC die (e.g., Die N) of multiple IC dies. After the next data group is written to the IC die (e.g., Die B here), the controller can increment the page map offset value of the NPMO 500.

In various embodiments, a page map offset value of the NPMO 500 can be stored in the block set entry in the block set data structure 307, e.g., as the page map entry identifier 377. In embodiments, the controller 115 can index into the page map data structure 305 using the page map offset value, and thus identify a page map entry that includes a wordline identifier, sub-block page identifier, and mode (e.g., physical address), as was previously discussed. In sequentially writing in series to the multiple IC dies, the controller begins writing a next data group within an identified IC die (e.g., Die B in this case) at the physical address to which points the NPMO 500.

Figure 5B:
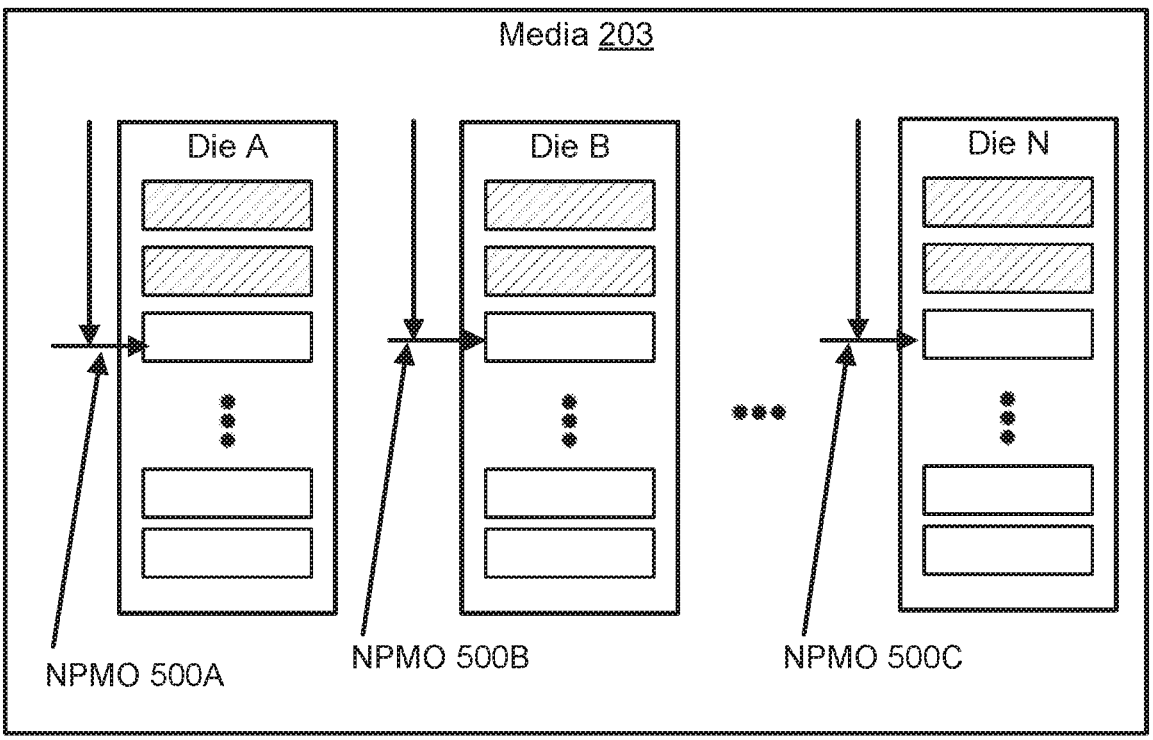
FIG. 5B is a media block diagram that illustrates functionality of the dynamic data placer in writing sequentially in parallel to the IC dies of the memory sub-system according to an embodiment.

FIG. 5B is a media block diagram the media 203 that illustrates functionality of the dynamic data placer 113 in writing sequentially in parallel to the IC dies of the memory sub-system 110 according to an embodiment. In this embodiment, in writing sequentially across the multiple IC dies, the controller 115 can instead write to the IC dies in parallel. More particularly, the controller 115 can write, in parallel, a first data block of the multiple data blocks to a first IC die, a second data block of the multiple data blocks to a second IC die, and a third data block of the multiple data blocks to a third IC die of the one or more IC dies. As discussed, writing sequentially in parallel across the IC dies can beneficially enable writing in different modes and/or for different sequential streams of data while avoiding write conflicts to any one die.

In various embodiments, each IC die has its own next page map offset, e.g., Die A has a first NPMO 500A, Die B has a second NPMO 500B, and Die N has an nth NPMO 500N, each of which can function as a pointer to a next sequential page location at which to continue writing across each IC die, e.g., Die A, Die B, . . . Die N, respectively. In this way, the IC dies can be filled up at roughly the same pace and supports writing a block set of data across multiple IC dies for multi-pass programming, for example (see FIG. 6). After each data group is written, respective next page offset values for the corresponding NPMO pointer is incremented by an amount of the data that was written to each IC die.

In some embodiments, in fulfilling a read command, the controller 115 can determine the page map offset value of a zone map entry by determining a value of a zone offset value modulo a block size. This page map offset value can then be used to index into the page map data structure 350, in order to access the remainder of the physical address information, e.g., to pinpoint a page to be read in an IC die. This process will be discussed in more detail with reference to FIG. 9.

Figure 6:
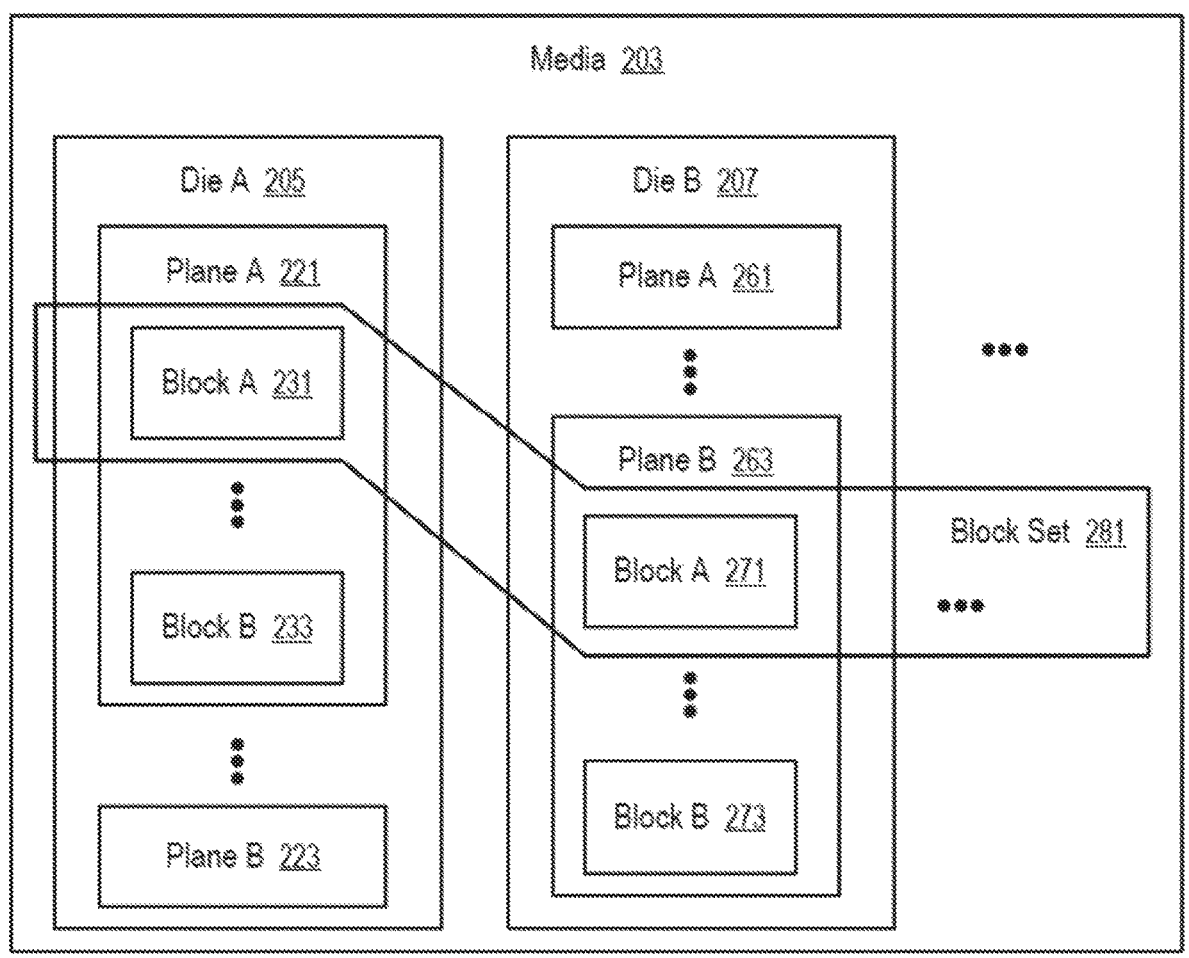
FIG. 6 is a media block diagram that illustrates a block set allocated across IC dies for multi-pass programming of data according to an embodiment.

FIG. 6 is a media block diagram that illustrates a block set allocated across IC dies for multi-pass programming of data according to an embodiment. In FIG. 6, the IC die A 205 has planes 221 to 223 and blocks (e.g., 231 to 233); and the integrated circuit die B 207 has planes 261 to 263 and blocks (e.g., 271 to 273).

In various embodiments, a block set 281 is allocated for a stream. The data of the stream is stored in the block set 281; and data of other streams is not stored in the block set 281. Thus, when the block set 281 is erased, only the data of the stream is erased. The entire data of the stream can be erased by erasing the block set 281.

The block set 281 can be identified using an entry in the block set data structure 307 illustrated in FIG. 4. In general, the block set 281 can be allocated on a subset of the integrated circuit dies (e.g., 205, 207, . . . ) in the media 203. For each of the blocks (e.g., 271), the entry in the block set data structure 307 identifies the die (e.g., 207) using the die identifier (e.g., 373), the block (e.g., 271) within the die (e.g., 207) using the block identifier (e.g., 375), and a next page in the block that is available for storing data using a page map entry identifier 377. The page map entry identifier 373 identifies an entry in the page map 305. The entry in the page map 305 shows the page identifier 351 of the page within the block (e.g., 271) and the programming mode 353.

In the block set 281, the dynamic data placer 113 can allocate one page from one die (e.g., 205) that is available to program data and repeat the allocation from another die (e.g., 207). The dynamic data placer 113 can allocate the separate pages from different dies for multi-pass programming and select the dies for allocation to reduce or eliminate padding until the entire host data to be communicated from the host system 120 to the memory sub-system together in one communication is allocated.

In various embodiment, the controller 115 writes a data group such that writing each multiplane page worth of the data is performed as one of: three first pass, single-level cell (SLC) programming on three different IC dies of the plurality of IC dies; one first pass, SLC programming on a first IC die and a second pass triple-level cell (TLC) programming on a second IC die of the plurality of IC dies; or a first pass SLC programming on a first IC die and a second pass multi-level (MLC) programming on a second IC die of the plurality of IC dies. Other programming combinations across different IC dies are envisioned.

FIG. 7 is a flow chart of a method 700 for sequentially mapping data that is sequentially written to the IC dies of the memory sub-system according to an embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the controller 115 (e.g., the dynamic data placer 113) of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 7, at operation 710, the processing logic stores, within a zone map data structure, zone map entries for zones of a logical block address (LBA) space sequentially mapped to physical address space of multiple IC dies. For example, the zone map entries may be created in the zone map data structure 301, as was discussed with reference to FIG. 4. A zone map entry in the zone map data structure 301 corresponds to a data group written to one or more IC dies of the multiple IC dies. In one embodiment, the data group contains at least hundreds of megabytes of data having locality.

At operation 720, the processing logic stores, within a block set data structure indexed by a block set identifier of the zone map entry, a die identifier and a block identifier for each of multiple data blocks of the data group. Each data block can correspond to a media block of the IC dies. For example, the processing logic can create a block set entry in the block set data structure 307 that is indexed by the block set identifier 313 of the zone map entry and that includes the die identifier 373 and the block identifier 375, as illustrated in FIG. 4. In one embodiment, each data block of the multiple data blocks contains over a hundred megabytes of data having locality, and thus the zone map entry can be at least two to four times a size of the media block.

At operation 730, the processing logic writes multiple data groups, which are sequentially mapped across the zones (e.g., Zone A 211, Zone B 213, . . . Zone P 219 of the namespace 201 (FIG. 3), sequentially across multiple IC dies, e.g., to sequentially mapped physical address locations. Sequentially writing in series to the multiple IC dies was discussed with reference to FIG. 5A. Sequentially writing in parallel to the multiple IC dies was discussed with reference to FIG. 5B.

FIG. 8 is a flow chart of a method 800 for fulfilling a write command using mapping data structures generated by the method of FIG. 7 according to various embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the controller 115 (e.g., the dynamic data placer 113) of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 8, at operation 810, the processing logic extracts, from a write command, the zone starting LBA identifier 311 at which to begin writing the data received from a host system and the sector count value to indicate a number of bytes of the data group. The zone starting LBA identifier 311 and the sector count value can then be used in various determinations or calculations in order to identify a physical address in one or more IC die where the data group is to be sequentially written.

At operation 815, the processing logic determines a zone identifier based on the zone starting LBA identifier and a zone size value. In one embodiment, the zone identifier is determined by dividing the zone starting LBA identifier 311 by the zone size value, which is known to the processing logic.

At operation 820, the processing logic determines a zone offset value based on the zone cursor value and a multiplane page size. In one embodiment, the zone offset value is determined by dividing the zone cursor value 315 by a multiplane page size, which is known to the processing logic.

At operation 825, the processing logic looks up the zone map entry within the zone map data structure 301 using the zone identifier. This action is to point into the zone map data structure 301 using the zone identifier. At operation 830, the processing logic extracts the block set identifier 313 from the zone map entry (see FIG. 4).

At operation 835, the processing logic determines the die identifier 373 and the block identifier 375 for each of the multiple data blocks via access to the block set entry, to which points the block set identifier. The block set entry is an entry into the block set data structure 307, which in one embodiment, is a table. In one embodiment, the zone offset value divided by the block size value determines a specific die identifier and block identifier. In some embodiments, each of the multiple data blocks of the data group is written to a different die and block corresponding to different die identifiers and block identifiers of respective sub-parts of the block set entry.

At operation 840, the processing logic determines the page map offset value for each of the multiple data blocks based on the zone offset value and the block size value. For example, the processing logic can determine the page map offset value in one embodiment by calculating the zone offset value modulo the block size value, which is known to the processing logic.

At operation 845, the processing logic determines a page identifier using the page map offset value to access the page map entry. The page identifier is to identify a page within each respective IC die and block, corresponding to the die identifier and block identifier, respectively, at which to begin writing respective ones of the multiple data blocks of the data group.

At operation 850, the processing logic increments the zone cursor value 315 by the number of bytes associated with the sector count. Incrementing the zone cursor value 315 enables the processing logic to know where writing ended and where to continue sequentially writing to the zone (LBA) space at a next write command.

At operation 855, the processing logic increments each page map offset value depending on the number of bytes written to respective ones of the one or more IC dies. Incrementing the page map offset value for the purpose of tracking where within each IC die writing is to be resumed was discussed with reference to FIGS. 5A-5B, which allows the processing logic to know the page at which to continue writing with each IC die of the media 203.

Figure 9:
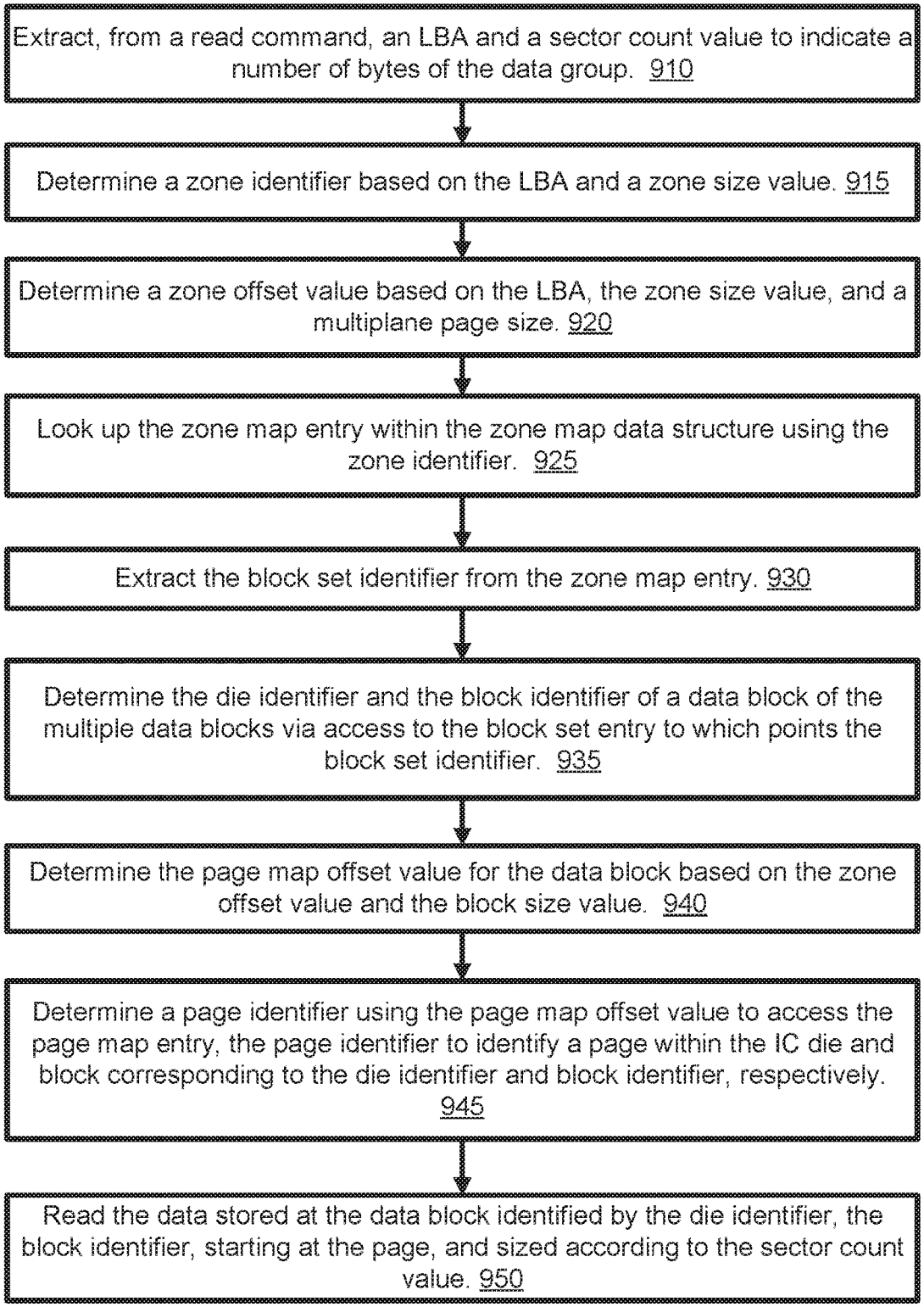
FIG. 9 is a flow chart of a method for fulfilling a read command using mapping data structures generated by the method of FIG. 7 according to various embodiments.

FIG. 9 is a flow chart of a method for fulfilling a read command using mapping data structures generated by the method of FIG. 7 according to various embodiments. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the controller 115 (e.g., the dynamic data placer 113) of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 9, at operation 910, the processing logic extracts, from a read command, an LBA and a sector count value to indicate a number of bytes of the data group. The LBA can be the logic block address with the logically-mapped zones that the controller 115 wants to read. At operation, 915, the processing logic determines a zone identifier based on the LBA and a zone size value. In one embodiment, the zone identifier is determined by dividing the LBA identifier 311 by the zone size value, which is known to the processing logic. At operation 920, the processing logic determines a zone offset value based on the LBA, the zone size value, and a multiplane page size. In one embodiment, the processing logic determines the zone offset value by determining the LBA modulo the zone size value and dividing a result thereof by a multiplane page size.

At operation 925, the processing logic looks up the zone map entry within the zone map data structure 301 using the zone identifier. This action is to point into the zone map data structure 301 using the zone identifier. At operation 930, the processing device extracts the block set identifier from the zone map entry.

At operation 935, the processing logic determines the die identifier and the block identifier of a data block of the multiple data blocks via access to the block set entry, to which points the block set identifier. The block set entry is an entry into the block set data structure 307, which in one embodiment, is a table. In one embodiment, the zone offset value divided by the block size value determines a specific die identifier and block identifier. In some embodiments, each of the multiple data blocks of the data group is written to a different die and block corresponding to different die identifiers and block identifiers of respective sub-parts of the block set entry.

At operation 940, the processing logic determines the page map offset value for the data block based on the zone offset value and the block size value. For example, the processing logic can determine the page map offset value in one embodiment by calculating the zone offset value modulo the block size value, which is known to the processing logic.

At operation 945, the processing logic determines a page identifier using the page map offset value to access the page map entry. The page identifier is to identify a page within the IC die and block corresponding to the die identifier and block identifier, respectively.

At operation 950, the processing logic reads the data stored at the data block identified by the die identifier, the block identifier, starting at the page, and sized according to the sector count value.

Figure 10:
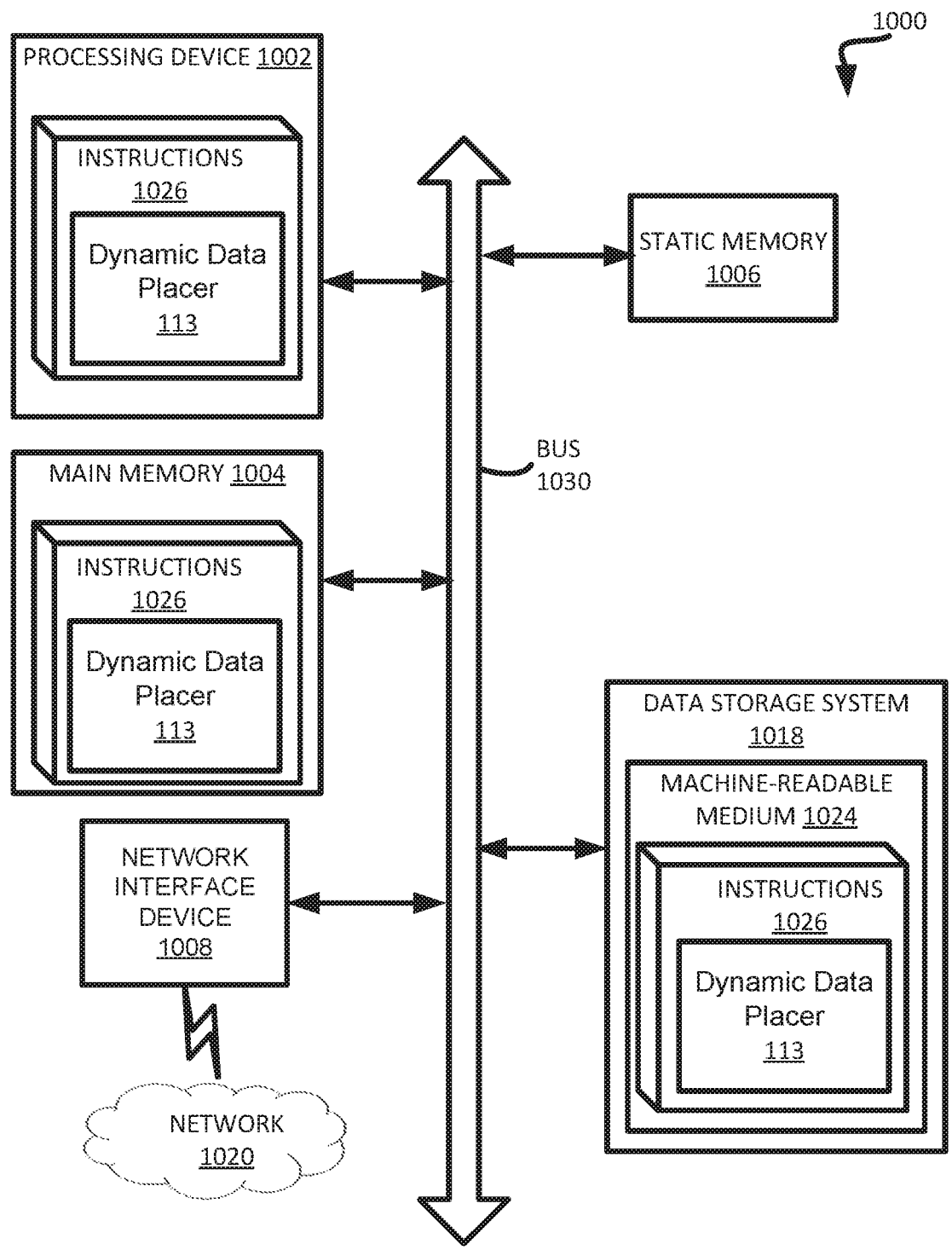
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to the dynamic data placer 113 of FIGS. 1-3. While the machine-readable storage medium 1024 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a plurality of integrated circuit (IC) dies having memory cells; and
    a processing device coupled to the plurality of IC dies, the processing device to perform operations comprising:
        storing, within a zone map data structure, zone map entries for zones of a logical block address (LBA)

space sequentially mapped to physical address space of the plurality of IC dies, wherein a zone map entry in the zone map data structure corresponds to a data group written to one or more IC dies of the plurality of IC dies;

storing, within a block set data structure indexed by a block set identifier of the zone map entry, a die identifier and a block identifier for each data block of multiple data blocks of the data group, wherein each data block corresponds to a media block of the IC dies; and writing multiple data groups, which are sequentially mapped across the zones, sequentially across the plurality of IC dies.

2. The system of claim 1, wherein the data group is at least two to four times a size of the media block and each data block of the multiple data blocks comprises at least 100 megabytes of data having locality, and wherein the processing device is further to store the zone map data structure and the block set data structure within random access memory.

3. The system of claim 1, wherein writing the multiple data groups comprises writing, in parallel, a first data block of the multiple data blocks to a first IC die, a second data block of the multiple data blocks to a second IC die, and a third data block of the multiple data blocks to a third IC die of the one or more IC dies.

4. The system of claim 1, wherein writing the data group comprises writing each multiplane page worth of the data as one of:
three first pass, single-level cell (SLC) programming on three different IC dies of the plurality of IC dies;
one first pass, SLC programming on a first IC die and a second pass triple-level cell (TLC) programming on a second IC die of the plurality of IC dies; or
a first pass SLC programming on a first IC die and a second pass multi-level (MLC) programming on a second IC die of the plurality of IC dies.

5. The system of claim 1, wherein the zone map entry comprises a zone starting LBA identifier, the block set identifier, and a zone cursor value that is an LBA offset within a zone, and wherein a block set entry in the block set data structure further comprises a page map offset value, for each data block of the multiple data blocks, that points to a page map entry indexed within a page map data structure.

6. The system of claim 5, wherein to write the data group to the one or more IC die, the processing device is further to perform operations comprising:
extracting, from a write command, the zone starting LBA identifier at which to begin writing the data received from a host system and a sector count value to indicate a number of bytes of the data group;
determining a zone identifier based on the zone starting LBA identifier and a zone size value;
determining a zone offset value based on the zone cursor value and a multiplane page size;
looking up the zone map entry within the zone map data structure using the zone identifier;
extracting the block set identifier from the zone map entry;
determining the die identifier and the block identifier for each data block of the multiple data blocks via access to the block set entry to which points the block set identifier; and
incrementing the zone cursor value by the number of bytes.

7. The system of claim 6, wherein the processing device is further to perform operations comprising:

determining the page map offset value for each data block of the multiple data blocks based on the zone offset value and a block size value;
determining a page identifier using the page map offset value to access the page map entry, the page identifier to identify a page within each respective IC die and block, corresponding to the die identifier and block identifier, respectively, at which to begin writing respective ones of the multiple data blocks; and
incrementing each page map offset value depending on the number of bytes written to respective ones of the one or more IC dies.

8. The system of claim 5, wherein to read the data group from the one or more IC dies, the processing device is further to perform operations comprising:
extracting, from a read command, an LBA and a sector count value to indicate a number of bytes of the data group;
determining a zone identifier based on the LBA and a zone size value;
determining a zone offset value based on the LBA, the zone size value, and a multiplane page size;
looking up the zone map entry within the zone map data structure using the zone identifier;
extracting the block set identifier from the zone map entry; and
determining the die identifier and the block identifier of a data block of the multiple data blocks via access to the block set entry, to which points the block set identifier.

9. The system of claim 8, wherein the processing device is further to perform operations comprising:
determining the page map offset value for the data block based on the zone offset value and a block size value;
determining a page identifier using the page map offset value to access the page map entry, the page identifier to identify a page within the IC die and block corresponding to the die identifier and block identifier, respectively; and
reading the data stored at the data block identified by the die identifier, the block identifier, starting at the page, and sized according to the sector count value.

10. A method comprising:
extracting, from a write command by a processing device coupled to a plurality of integrated circuit (IC) dies, a zone starting logical block address (LBA) identifier at which to begin writing a data group received from a host system;
storing, by the processing device within a zone map data structure, zone map entries for zones of an LBA space sequentially mapped to physical address space of the plurality of IC dies, the LBA space including the zone starting LBA identifier, wherein a zone map entry in the zone map data structure corresponds to the data group to be written to one or more IC dies of the plurality of IC dies;
storing, by the processing device within a block set data structure indexed by a block set identifier from the zone map entry, a die identifier and a block identifier for each data block of multiple data blocks of the data group, wherein each data block corresponds to a media block of the IC dies; and
writing, by the processing device, the multiple data blocks of the data group to sequentially mapped physical address locations, of the one or more IC dies, corresponding to at least the zone starting LBA identifier, and to each die identifier and block identifier.

11. The method of claim 10, wherein the data group is at least two to four times a size of the media block comprises data having locality, the method further comprising writing multiple data groups, which are sequentially mapped to logical block addresses of the zones, sequentially across the plurality of IC dies.

12. The method of claim 10, wherein writing the multiple data blocks comprises writing each multiplane page worth of data of the data group as one of:
- three first pass, single-level cell (SLC) programming on three different IC dies of the plurality of IC dies;
- one first pass, SLC programming on a first IC die and a second pass triple-level cell (TLC) programming on a second IC die of the plurality of IC dies; or
- a first pass SLC programming on a first IC die and a second pass multi-level (MLC) programming on a second IC die of the plurality of IC dies.

13. The method of claim 10, wherein the zone map entry comprises the zone starting LBA identifier, the block set identifier, and a zone cursor value that is an LBA offset within a zone, and wherein writing the data group to the one or more IC dies further comprises:
- extracting, from the write command, a sector count value that indicates a number of bytes of the data group;
- determining a zone identifier by dividing the zone starting LBA identifier by a zone size value;
- determining a zone offset value by dividing the zone cursor value by a multiplane page size;
- looking up the zone map entry within the zone map data structure using the zone identifier;
- extracting the block set identifier from the zone map entry;
- determining the die identifier and the block identifier for each data block of the multiple data blocks via access to a block set entry to which points the block set identifier; and
- incrementing the zone cursor value by the number of bytes.

14. The method of claim 13, wherein the block set entry in the block set data structure further comprises a page map offset value, for each data block of the multiple data blocks, that points to a page map entry indexed within a page map data structure, the method further comprising:
- determining the page map offset value for each data block of the multiple data blocks comprising the zone offset value modulo a block size value;
- determining a page identifier using the page map offset value to access the page map entry, the page identifier to identify a page within each respective IC die and block, corresponding to the die identifier and block identifier, respectively, at which to begin writing respective ones of the multiple data blocks; and
- incrementing each page map offset value depending on the number of bytes written to respective ones of the one or more IC dies.

15. The method of claim 10, wherein the zone map entry comprises the block set identifier and a zone cursor value that is an LBA offset within a zone, and wherein to read the data group from the plurality of IC dies, the method further comprising:
- extracting, from a read command, an LBA and a sector count value to indicate a number of bytes of the data group;
- determining a zone identifier by dividing the LBA by a zone size value;
- determine a zone offset value comprising the LBA modulo the zone size value and dividing a result thereof by a multiplane page size;
- looking up the zone map entry within the zone map data structure using the zone identifier;
- extracting the block set identifier from the zone map entry; and
- determining the die identifier and the block identifier of a data block of the multiple data blocks via access to the block set entry to which points the block set identifier.

16. The method of claim 15, wherein the block set entry in the block set data structure further comprises a page map offset value, for each data block of the multiple data blocks, that points to a page map entry indexed within a page map data structure, the method further comprising:
- determining the page map offset value for the data block comprising the zone offset value modulo the block size;
- determining a page identifier using the page map offset value to access the page map entry, the page identifier to identify a page within the IC die and block corresponding to the die identifier and block identifier, respectively; and
- reading the data stored at the data block identified by the die identifier, the block identifier, starting at the page, and sized according to the sector count value.

17. A non-transitory machine-readable storage medium storing instructions which, when executed in a memory sub-system having a plurality of integrated circuit (IC) dies, causes the memory sub-system to perform operations comprising:
- storing, within a zone map data structure, zone entries for zones of a logical block address (LBA) space sequentially mapped to physical address space of the plurality of IC dies, wherein a zone map entry in the zone map data structure corresponds to a data group written to one or more IC dies of the plurality of IC dies;
- storing, within a block set data structure indexed by a block set identifier from the zone map entry, a die identifier and a block identifier for each data block of multiple data blocks of the data group, wherein each data block comprises data having locality and corresponds to a media block of the plurality of IC dies, and wherein a size of the data group is at least two to four times a size of the media block; and
- writing multiple data groups, which are sequentially mapped across the zones, sequentially across the plurality of IC dies.

18. The non-transitory machine-readable storage medium of claim 17, wherein writing the multiple data groups comprises writing the multiple data blocks of each data group of the multiple data groups until sequentially filling up a first IC die followed by sequentially filling up a second IC die of the plurality of IC dies.

19. The non-transitory machine-readable storage medium of claim 17, wherein the zone map entry comprises a zone starting LBA identifier, the block set identifier, and a zone cursor value that is an LBA offset within a zone, and wherein writing the data group to the plurality of IC dies further comprises operations comprising:
- extracting, from a write command, a zone starting LBA identifier at which to begin writing the data group received from a host system and a sector count value to indicate a number of bytes of the data group;
- determining a zone identifier based on the zone starting LBA identifier and a zone size value;
- determining a zone offset value based on the zone cursor value and a multiplane page size;

looking up the zone map entry within the zone map data structure using the zone identifier;

extracting the block set identifier from the zone map entry;

determining the die identifier and the block identifier for each data block of the multiple data blocks via access to a block set entry to which points the block set identifier; and incrementing the zone cursor value by the number of bytes.

20. The non-transitory machine-readable storage medium of claim 19, wherein the block set entry in the block set data structure further comprises a page map offset value, for each data block of the multiple data blocks, that points to a page map entry indexed within a page map data structure, and wherein the operations further comprising:

determining the page map offset value for each data block of the multiple data blocks based on the zone offset value and the block size;

determining a page identifier using the page map offset value to access the page map entry, the page identifier to identify a page within each respective IC die and block, corresponding to the die identifier and block identifier, respectively, at which to begin writing respective ones of the multiple data blocks; and incrementing each page map offset value depending on the number of bytes written to respective ones of the one or more IC dies.

\* \* \* \* \*